S. J. MOZUR.
SAFETY VALVE.
APPLICATION FILED JUNE 1, 1920.
1,376,565.
Patented May 3, 1921.
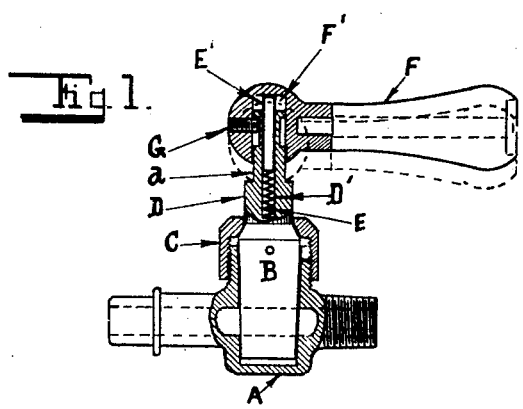
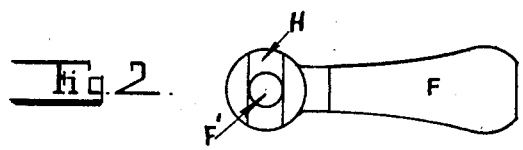
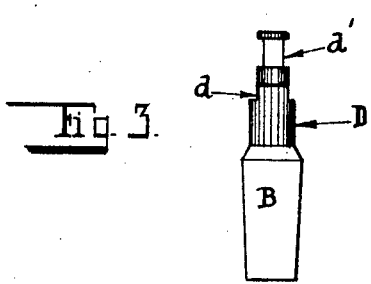
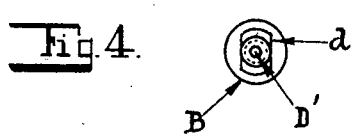
Inventor.
Stanislaus J. Mozur
By J. C. Armstrong
atty.

UNITED STATES PATENT OFFICE.

STANISLAUS J. MOZUR, OF ERIE, PENNSYLVANIA, ASSIGNOR TO KASIMER W. MOZUR, OF ERIE, PENNSYLVANIA.

SAFETY-VALVE.

1,376,565.     Specification of Letters Patent.     Patented May 3, 1921.

Application filed June 1, 1920. Serial No. 385,629.

*To all whom it may concern:*

Be it known that I, STANISLAUS J. MOZUR, a citizen of the United States, residing at Erie, in the county of Erie and State of Pennsylvania, have invented certain new and useful Improvements in Safety-Valves; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to safety appliance for gas valves and consists in providing the valve with an operating handle which in its normal position will not turn the valve plug.

The features of my invention are hereinafter set forth and pointed out and are illustrated in the accompanying drawings in which:

Figure 1, is a side view partly in central vertical section, of a valve having my invention embodied thereon.

Fig. 2, is a view of the under side of the handle removed from the valve.

Fig. 3, is a side elevation of the valve plug.

Fig. 4, is a top view of Fig. 3.

In these drawings A indicates the body of the valve; B indicates the rotatable valve plug; C indicates a screw cap adapted to hold the plug B in place in the body A; said parts being of ordinary construction.

In carrying out my invention I provide a stem D on the upper end of the valve plug B having the sides thereof flattened as at $d$. Above said flattened portion I provide an annular groove $d'$. Within the stem D I provide a central longitudinal hole $D'$ in which I place a spring E; and above the spring E I place a small plunger $E'$ which extends from the spring upwardly a short distance beyond the upper end of the stem D. Upon this stem D I place a handle F, in the hub of which is a hole $F'$ adapted to receive the upper end of the stem D thereinto; the plunger $E'$ engaging the bottom of the hole $F'$ and compressing the spring E so that the screw plug G provided in the hub of the handle F will enter the annular groove $d'$ and retain the handle F on the stem D.

The under side of the handle F is provided with a transverse slot H which receives the flattened portions of the stem D thereinto when the handle F is pressed downwardly, and as shown by broken lines in Fig. 1, when the handle F will turn the plug B if desired. If the handle F is not pressed down to the position shown in broken lines in Fig. 1, it will revolve freely upon the stem D without turning the plug B. It is therefore obvious that this valve will not open by reason of accidents, nor by uninstructed persons, as the handle will not revolve the plug unless it is first pressed downwardly thereto.

Having thus fully shown and described my invention so that others can utilize the same, what I claim as new and desire to secure by Letters Patent is:

In a device of the class described, a valve plug, a stem thereon, flat surfaces on opposite sides of said stem, an axial post of less diameter than the width of said stem between said flat surfaces extending above said stem, an annular flange at the upper end of said post, said stem and post having a central longitudinal hole therein, a spring in said central longitudinal hole adapted to yieldingly maintain said handle in its uppermost position on said stem, a handle journaled on said stem and flange, a set-screw in said handle adapted to engage the under side of said flange to retain said handle on said stem, said handle having a transverse slot in the under side thereof adapted to embrace the flat sides on said stem when said handle is pressed downwardly thereon, substantially as set forth.

In testimony whereof I affix my signature.

STANISLAUS J. MOZUR.